United States Patent [19]

Bryant

[11] Patent Number: 4,553,250
[45] Date of Patent: Nov. 12, 1985

[54] SIGNAL TRANSMISSION SYSTEM

[75] Inventor: Stewart F. Bryant, Reading, England

[73] Assignee: U.S. Philips Corporation, New York, N.Y.

[21] Appl. No.: 440,891

[22] Filed: Nov. 12, 1982

[30] Foreign Application Priority Data

Dec. 2, 1981 [GB] United Kingdom ................. 8136349

[51] Int. Cl.$^4$ .............................................. H04L 1/22
[52] U.S. Cl. ......................................... 375/34; 371/2; 375/38; 375/57
[58] Field of Search ....................... 375/34, 38, 57, 25, 375/40; 455/8, 17, 59, 132, 133, 135, 63; 371/2, 6, 22, 41, 48, 68, 8, 10; 340/825.01

[56] References Cited

U.S. PATENT DOCUMENTS

| 3,622,885 | 11/1971 | Kraszynski et al. | 375/38 |
| 3,896,416 | 7/1975 | Barrett et al. | 371/41 |
| 3,909,721 | 9/1975 | Bussgang et al. | 375/57 |
| 4,283,786 | 8/1981 | Okamura | 375/34 |

Primary Examiner—Benedict V. Safourek
Attorney, Agent, or Firm—Joseph P. Abate

[57] ABSTRACT

A signal transmission system comprises a transmitter, a receiver and a transmission link in which the signal to be transmitted is pulse code modulated. The transmission link comprises a plurality of channels (0—7), one for each bit of the pulse code modulated signal. The quality of each channel is monitored and the bits of the pulse code modulated signal are applied to the channels such that the most significant bits of the pulse code modulated signal are allocated to the channels having the lowest level of interfering signal.

4 Claims, 5 Drawing Figures

SIGNAL TRANSMISSION SYSTEM

BACKGROUND OF THE INVENTION

The invention relates to a signal transmission system comprising a transmitter, a receiver, and a transmission link in which the signal to be transmitted is pulse code modulated.

Transmission systems for digitized voice signals commonly employ either delta modulation or pulse code modulation. Radio links frequently use delta modulation because of the relative simplicity of the equipment required and because of its immunity to the effects of interference. The greater noise immunity of a delta modulated signal compared with that of a pulse code modulated signal arises because, for delta modulation, all bits are of equal significance whereas for pulse code modulation some bits are of critical importance, for example the sign bit.

SUMMARY OF THE INVENTION

It is an object of the invention to provide a signal transmission system using pulse code modulation which for certain types of interference has a greater noise immunity than conventional pulse code modulation signal transmission systems.

The invention provides a signal transmission system as described in the opening paragraph characterized in that the transmission link comprises an individual channel for each bit of a ward of the pulse code modulated signal and that the bits of the word are assigned to channels according to the quality of the channel so that the higher the significance of the bit the better the quality of the channel that is assigned to that bit.

With a signal transmission system according to the invention, it is possible to obtain an improved quality of transmission when the interference is not random across the full frequency range of the channels but is concentrated in particular parts of the frequency spectrum. By allocating the least significant bits of each word of the PCM signal to channels in the part of that frequency spectrum most prone to interference, the whole effect of that interference on the speech signal is minimized.

The quality of each channel may be monitored at regular intervals during signal transmission or may be re-assessed on demand by the user when the overall quality of the transmission link as perceived by the user deteriorates.

The signal transmission system may comprise means for assessing the quality of each channel and means for assigning the bits of each word of the pulse code modulated signal to the appropriate channel, wherein the means for assessing the quality of each channel comprises means for generating a predetermined code at one end of the transmission link, means for transmitting the predetermined code over each of the transmission channels, and means for comparing the code received over the transmission link with a code stored within the receiver at the other end of the transmission link to determine the number of errors produced in each channel; and the means for assigning the bits to the appropriate channels comprises means for transmitting a code from the other end of the transmission link to the one end of the transmission link indicating the channels in order of quality, means for controlling a switching network at the one end of the transmission link to assign the bits of each word of the pulse code modulated signal to the appropriate transmission channel and means for controlling a second switching network at the other end of the transmission link to restore the order of significance of the bits of each word of the pulse code modulated signal. The same predetermined code may be sent over each channel. The signal may be encoded into an 8 bit pulse code.

The signal transmission system may be used in any communication system but can particularly be applied to cordless telephone systems or citizens band or amateur radio communications where channels may be randomly allocated (or taken) and propagation conditions may be variable.

DESCRIPTION OF THE DRAWINGS

An embodiment of the invention will now be described, by way of example, with reference to the accompanying drawings, in which:-

DESCRIPTION OF THE PREFERRED EMBODIMENTS

Figure 1:
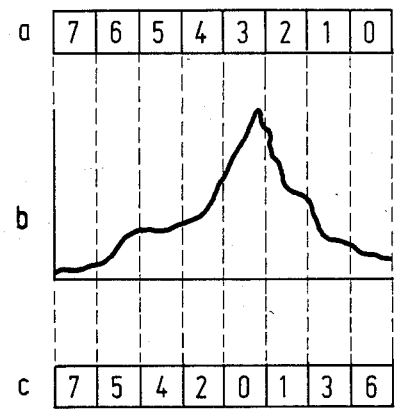
FIG. 1 shows the frequency spectrum of a transmission link and the way in which the individual channels are allocated to separate bits of a word of the pulse code modulated signal in a transmission system according to the invention.

A speech signal sent down a 64K bits/s digital transmission path is normally companded and sent as a serial bit stream, as the coded amplitude of a series of samples of the signal amplitude taken at $125\mu$ Sec intervals, for example as specified in recommendation G711 of the CCITT. Such a signal will be sensitive to interference as any loss or false detection of the more significant bits of the code may render the speech unintelligible. However, if instead of sending the signal serially over a 64K bits/s link, it is sent in parallel over eight 8K bit/s channels the effects of non-random interference can be minimized by correctly allocating the bits of each word of the PCM signal to the channels. Thus if, in accordance with the invention, the least significant bits of each PCM word are allocated to the noisiest channels the effects of the noise or interference can be minimized. FIG. 1(a) shows eight channels 0 to 7 and FIG. 1(b) shows the distribution of interfering signals within the channels. FIG. 1(c) then shows the order of significance of the bits of the PCM word allocated to each channel. As can be seen, the highest significant bits (7,6,5) of the PCM word are assigned to the channels having the lowest level of interfering signals while the lowest significance bits (1,0) are assigned to the channels having the highest level of interfering signals.

Figure 2:
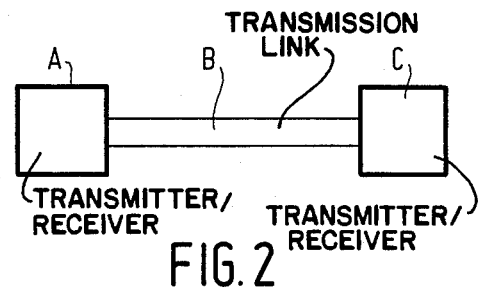
FIG. 2 shows in block schematic form a transmission system according to the invention.

FIG. 2 shows two transmitter/receivers A and C connected by transmission link B. The transmission link may comprise n channels, one for each bit of a word of the PCM signal or may comprise 2n channels for independent transmission in each direction. The channels may be provided in any convenient way, for example as individual conductors or as channels in a frequency division multiplex system which may use line or radio transmission.

Figure 3:
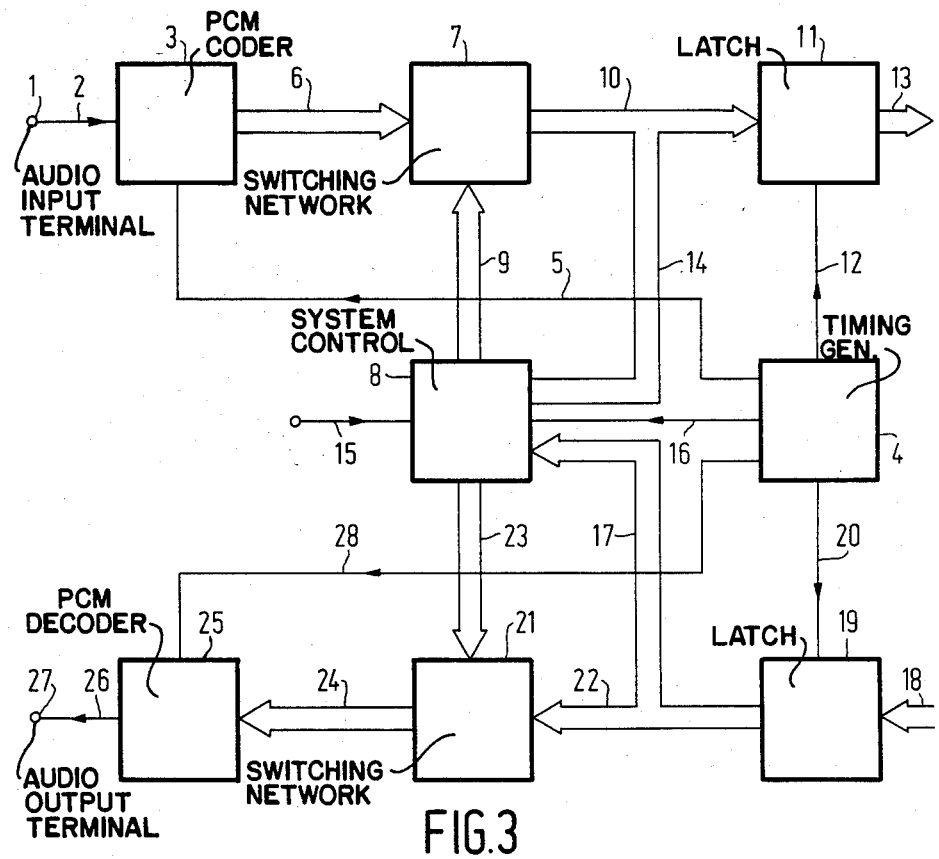
FIG. 3 shows in greater detail the structure of a transmitter/receiver suitable for use in a transmission system according to the invention.

FIG. 3 shows in block schematic form an embodiment of a transmitter/receiver for one end of a transmission link in a transmission system according to the invention. An audio signal is applied to a terminal 1 and fed via a line 2 to a PCM coder 3. The coder 3 produces an 8 bit parallel code which represents the amplitude of the audio signal at regular time intervals governed by timing signals applied to the coder 3 from a timing generator 4 via a line 5. The output of the coder 3 is fed via an 8 bit highway 6 to the input of a switching network 7 whose operation is controlled by a system controller 8 via a highway 9. The output of the switching network 7 is fed via a highway 10 to an 8 bit latch 11 under the control of a timing pulse generated by the timing generator 4 and fed to the latch 11 via a line 12. The output of the latch 11 is fed via an eight bit highway 13 to the inputs of the transmission channels where they are amplified and further modulated for transmission in any convenient manner. The latch 11 is also driven by the system controller 8 via an 8 bit highway 14.

The system controller 8 receives input signals on a line 15 which carries a DEMAND signal which, when it is desired to transmit information, is generated by, for example, a manually operated switch. It also receives timing signals from the timing generator 4 on a line 16 and control signals on an 8 bit highway 17 which are received from the other end of the transmission link. Data received over the transmission link is demodulated and detected in any convenient manner and fed as an 8 bit parallel code on a highway 18 to a latch 19 from which, under the control of a timing signal on line 20 from the timing generator 4, the code is fed to the system controller 8 via the highway 17 and to a switching network 21 via a highway 22. The switching network 21 is controlled by the system controller 8 over highway 23. The outputs of the switching network 21 are fed via an 8 bit highway 24 to a PCM decoder 25 which produces an audio output which is fed via a line 26 to an output terminal 27. The PCM decoder 25 is also fed with timing signals from the timing generator 4 over a line 28.

The operation of the transmitter/receiver shown in FIG. 3, which for the sake of illustration is assumed to be transmitter/receiver A of FIG. 2, and its interaction with a transmitter/receiver C of FIG. 2 at the other end of the transmission link C is as follows. When it is desired to communicate over the transmission link a DEMAND signal is generated, for example by manual operation of a switch, and fed to the system controller 8. The system controller 8 produces a predetermined start code in response to the DEMAND signal which is fed via the highway 14, latch 11, and highway 13 to the transmission channels. The start code is detected in the receiver at the other end of the transmission link and used to initialize the state of the receiver. A further predetermined code, which may be chosen so that each of the transmission channels transmits an identical sequence, is then generated by the system controller 8 and transmitted along the transmission link B. This code is detected in the receiver of the transmitter/receiver C and the quality of each transmission channel is determined. The transmitter/receiver C then transmits a code back to the transmitter/receiver A indicating the quality of each transmission channel. This code may be, for example, merely a return of channel numbers in order of quality. These codes may be transmitted serially as octal numbers with idential codes on each channel. The incoming codes may then be detected and used by the system controller 8 to control the switching network 7 so that the PCM bits are routed to the desired channels. The system controller 8 may also use the incoming codes to assess the quality of the transmission channels from C to A as these may well be different from those from A to C. In that case, the system controller 8 will cause a code to be sent from A to C to cause the system controller in transmitter/receiver C to set its transmitter switching network to allocate the PCM bits in the most favorable manner. At the same time, the system controller 8 will set up the switching network 21 to route the received PCM bits in such a manner as to restore their positions in order of significance for application to the PCM decoder 25.

The PCM coder 3 and decoder 25 may be formed from commercially available codecs and, if necessary, serial-to-parallel and parallel-to-serial converters. The switching networks 7 and 21 may comprise eight line to one line multiplexers having their outputs connected to respective lines of the highways 10 and 24, respectively. The inputs of each multiplexer are then connected to individual lines of the highways 6 and 22, respectively. The select inputs of the multiplexers are connected to the highways 9 and 23 so that the appropriate input of each multiplexer can be selected. The system controller 8 may contain storage devices, e.g. latches, to hold the addresses for the multiplexers constantly on the highways 9 and 23 during the duration of a transmission or the latches may form part of the switching networks. The system controller 8 may be realized as a microcomputer but may alternatively be formed as a hard wired logic circuit comprising address generators, code generators, comparators and storage devices. The logic circuitry could take many diverse forms and a suitable design would be apparent to one skilled in the art given the functions which the controller 8 has to perform. The timing generator 4 comprises a clock generator and associated divider chains and decoding logic.

Figures 4A, 4B:
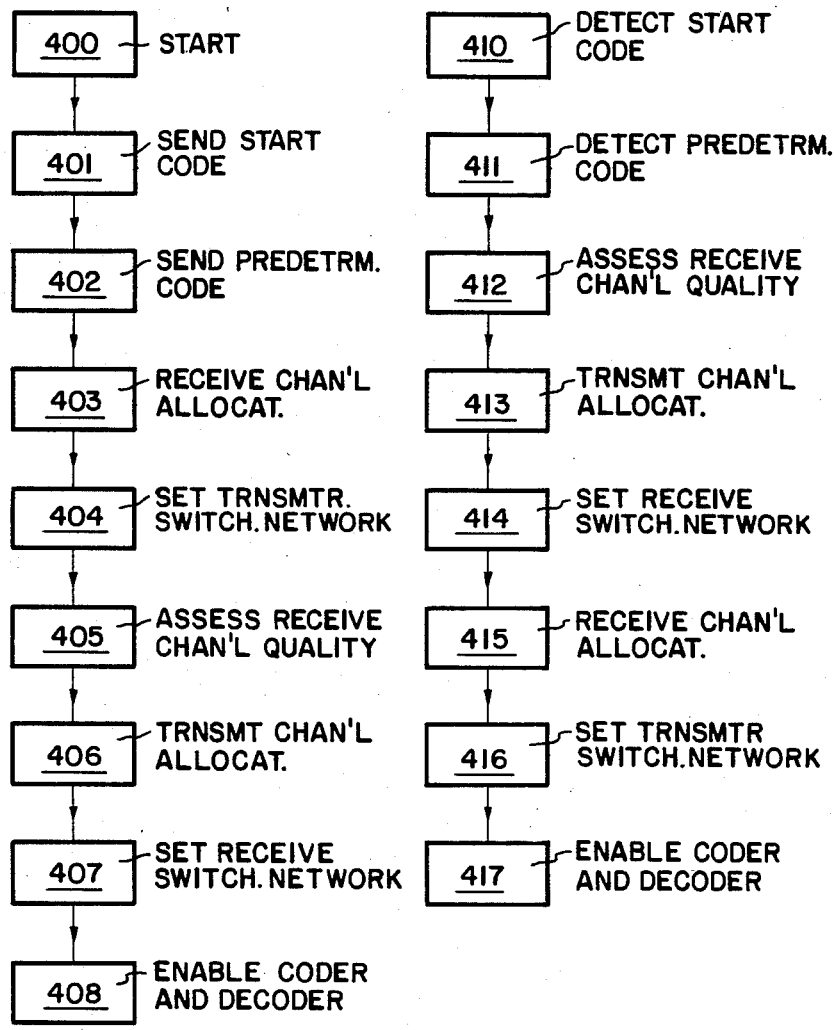
FIGS. 4a and 4b show flow diagrams illustrating the sequence of operation in the transmitter/receiver at each end of the transmission link in a transmission system according to the invention.

FIGS. 4a and 4b are flow diagrams illustrating the procedure, at each transmitter/receiver, by which the transmission link is set up, FIG. 4(a) illustrating the procedure at the initiating transmitter/receiver. The initials within the boxes 400 to 408 and 410 to 417 stand for the following functions.

S—Start
SSC—Send Start Code
SPC—Send Predetermined Code
RCA—Receive Channel Allocation
STSN—Set Transmitter Switching network
ARCQ—Assess Receive Channel Quality
TCA—Transmit Channel Allocation
SRSN—Set Receive Switching Network
ECD—Enable PCM Coder and Decoder
DSC—Detect Start Code
DPC—Detect Predetermined Code.

Box 400 labelled S represents the generation of the DEMAND signal in response to which the system controller 8 causes a start code to be transmitted represented by box 401 labelled SSC. After the start code has been sent the system controller 8 causes a preset code to be sent from which the receiver at the other end of the transmission link assesses the quality of each of the transmission channels in the first transmission direction. This is represented by the box 402 labelled SPC. The system controller 8 then awaits the reception of the channel allocation generated by the receiver/transmitter at the other end of the transmission link. This is represented by the box 403 labelled RCA. The system controller 8 then sets up the switching network 7 connected in the transmitter over the highway 9, this step being shown as box 404 labelled STSN. The system controller 8 also assesses the quality of each of the channels in the transmission link in the second transmission direction as shown by box 405 labellled ARCQ. This assessment may, for example, use an analysis of the channel allocation code sent by the transmitter at the other end of the transmission link or an analysis of a predetermined code sent by that transmitter. From this analysis a code is generated by the system controller 8 and sent via the highway 14, latch 11 and highway 13 to the transmission channels for transmission to the receiver at the other end of the transmission link. This procedure is represented by the box 406 labelled TCA. The system controller 8 also sets up the switching network 21 connected in the receiver via the highway 23 so that the received signal is routed to the PCM decoder 25 in the correct order of significance, this procedure being represented by box 407 labelled SRSN. The PCM coder 3 and decoder 25 are then enabled, box 408 labelled ECD, to enable voice communication between the two ends of the transmission link.

The operation of the transmitter/receiver at the other end of the transmission link is similar to that of the transmitter receiver at the initiating end and, in practice, both transmitter/receivers may be capable of operating at both ends of the transmission link. The operation of the transmitter/receiver at the other end of the transmission link is illustrated in the flow diagram shown in FIG. 4(b). Box 410 labelled DSC represents the function of detecting that a start code has been received from the initiating transmitter. This function will be performed by the system controller 8 which will also cause the transmitter/receiver to be set to an initial known state. The receiver is then set to recognize the predetermined code which is expected to be received after the reception of the start code and will compare the received predetermined code with information stored within the system controller 8, box 411 labelled DPC, so that the quality of each transmission channel can be assessed (box 412 labelled ARCQ). The system controller 8 then transmits a code to allocate the channels in order of quality to the bits of the PCM signal in the originating transmitter, (box 413 labelled TCA). The system controller 8 also feeds a code over the highway 23 to the switching network 21 in its receiver to cause the switching network to correctly re-assemble the received PCM mode code bits into order of their significance before feeding them to the PCM decoder 25, (box 414 labelled SRSN). A channel allocation is then received from the originating transmitter/receiver which is decoded in the system controller 8 (box 415 labelled RCA) and used to generate control signals which are fed along the highway 9 to the switching network 7 (box 416 labelled STSN). Finally, the PCM coder 3 and decoder 25 are enabled to allow voice communication between the two ends of the transmission link.

Various modifications to the arrangement shown in FIGS. 2 and 3 may be made. For example a greater or lesser number of bits and hence channels may be used to encode the voice signals. The DEMAND signal may be generated by alternative means such as a voice operated switch. The same transmission channels may be used for transmission in both directions in which case it may be satisfactory to assess the channel quality at one end of the transmission link only and to set the switching networks at both ends to the same configuration.

The quality of the channels may be continuously assessed by sending a checking code at regular intervals. Instead of sending a start code and a subsequent predetermined code to assess the quality of the channels, the predetermined code may form part of the start code. If the individual channels are frequency division multiplexed each frequency division multiplex channel may be further subdivided into time division multiplex sub channels so that a multiplicity of conversations may be transmitted.

I claim:

1. A signal transmission system comprising a transmitter and a receiver at each end of a transmission link in which a signal to be transmitted is pulse code modulated, characterized in that the transmission link comprises an individual channel for each bit of a word of the pulse code modulated signal and the transmission system comprises means for assessing the quality of each channel and means for assigning the bits of the word to the channels according to the quality of each channel, so that the higher the significance of the bit the better the quality of the channel that is assigned to that bit.

2. A system as claimed in claim 1, in which each channel is used for transmission in both directions and in which the quality of the channel is assessed at one end of the transmission link.

3. A signal transmission system as claimed in claim 1, wherein the means for assessing the quality of each channel comprises means for generating a predetermined code at one end of the transmission link, means for transmitting the predetermined code over each of the transmission channels, and means for comparing the code received over the transmission link with a code stored within the receiver at the other end of the transmission link to determine the number of errors produced in each channel; and the means for assigning the bits to the appropriate channels comprises means for transmitting a code from the other end of the transmission link to the one end of the transmission link indicating the channels in order of quality, means for controlling a switching network at the one end of the transmission link to assign the bits of each word of the pulse code modulated signal to the appropriate transmission channel and means for controlling a second switching network at the other end of the transmission link to restore the order of significance of the bits.

4. A signal transmission system as claimed in claim 3, in which the same predetermined code is sent over each channel.

* * * * *